US009164868B2

(12) United States Patent
Mayer (10) Patent No.: US 9,164,868 B2
(45) Date of Patent: Oct. 20, 2015

(54) MULTI-TIER TRACE

(71) Applicant: Infineon Technologies AG, Neubiberg (DE)

(72) Inventor: Albrecht Mayer, Deisenhofen (DE)

(73) Assignee: Infineon Technologies AG, Neubiberg (DE)

(*) Notice: Subject to any disclaimer, the term of this patent is extended or adjusted under 35 U.S.C. 154(b) by 338 days.

(21) Appl. No.: 13/762,660

(22) Filed: Feb. 8, 2013

(65) Prior Publication Data
US 2014/0189437 A1 Jul. 3, 2014

Related U.S. Application Data

(60) Provisional application No. 61/746,390, filed on Dec. 27, 2012.

(51) Int. Cl.
*G06F 11/00* (2006.01)
*G06F 11/34* (2006.01)

(52) U.S. Cl.
CPC .................................. *G06F 11/3495* (2013.01)

(58) Field of Classification Search
CPC .................................. G06F 11/3466–11/3495
See application file for complete search history.

(56) References Cited

U.S. PATENT DOCUMENTS

2012/0042212 A1* 2/2012 Laurenti ........................ 714/45
2012/0266029 A1* 10/2012 Mayer et al. .................. 714/45

OTHER PUBLICATIONS

CoreSight Technology, System Design Guide, 2010, ARM Limited.*

* cited by examiner

*Primary Examiner* — Michael Maskulinski
(74) *Attorney, Agent, or Firm* — Eschweiler & Associates, LLC (57) ABSTRACT

The disclosure relates to methods and systems for trace solutions in a computer processing system. More specifically, the disclosure relates to methods and systems for a multi-tier trace architecture. A method for separating raw trace data includes receiving raw trace data from one of more CPUs and/or busses in the system, separating the raw trace data into high bandwidth trace information (HBTI) and low bandwidth trace information (LBTI), recording the HBTI on an on-chip trace buffer until a specific event is triggered, and providing in parallel the LBTI over an off-chip trace interface. In one embodiment, the raw trace data are provided to a separate HBTI trace unit and a separate LBTI respectively. The HBTI trace unit processes the HBTI and generates a HBTI message, and the LBTI trace unit processes the LBTI and generates a LBTI message.

35 Claims, 5 Drawing Sheets

MULTI-TIER TRACE

CROSS-REFERENCE TO RELATED APPLICATION

This application claims priority to U.S. Provisional Patent Application Ser. No. 61/746,390 filed on Dec. 27, 2012, entitled "Multi-Tier Trace", the contents of which are hereby incorporated by reference.

FIELD

The disclosure relates to methods and systems for trace solutions in a computer processing system. More specifically, the disclosure relates to methods and systems for a multi-tier trace architecture for observing and tracing one or more computer processing units in a real time system.

BACKGROUND

For software debugging or performance analysis, a trace flow enables the reconstruction of a monitored program flow and is therefore useful to determine which kind of events took place before a particular software problem arose. A trace system or architecture is used to observe the behavior of a real time control system (e.g. automotive Electronic Control Unit ECU) on a higher level. Such a real time control system gets input values from sensors from which the control algorithm calculates actuator values. All these values are so called signals, which need to be observed for analyzing the system behavior.

Figure 1:
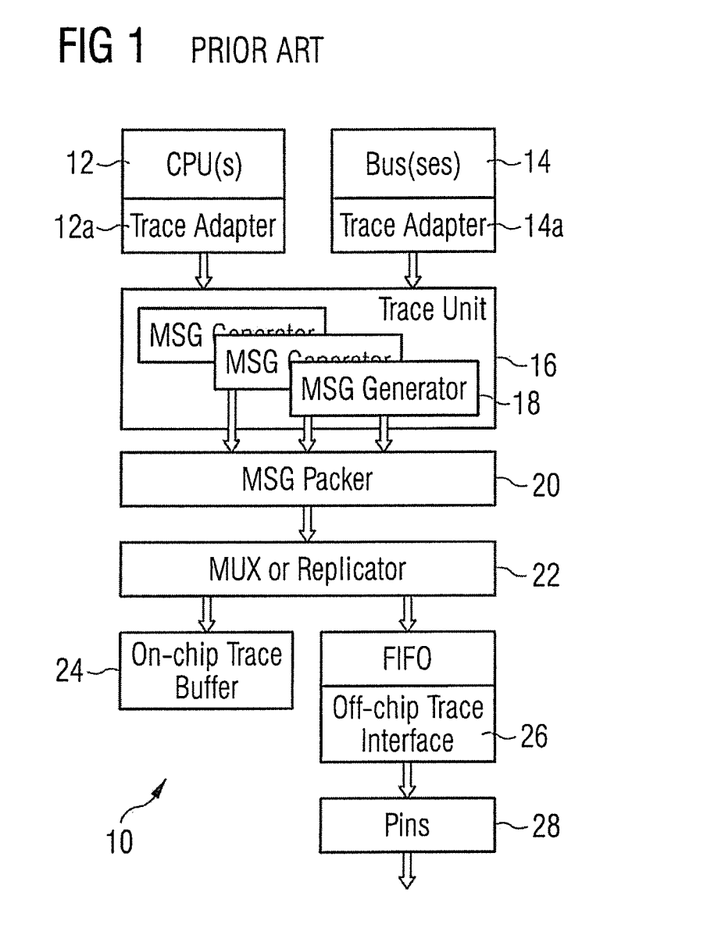
FIG. 1 shows a schematic diagram of a conventional trace system.

FIG. 1 is a high-level block diagram illustrating a conventional trace architecture for a computer system 10. The conventional trace system is implemented on a microchip and may include one or more central processing units (CPUs) 12 with a trace adapter 12a, one or more busses 14 with a local trace adapter 14a, and a trace unit 16 coupled to receive trace data from the one or more CPUs 12 and the one or more busses 14. The trace unit 16 further comprises a message generator 18 for generating trace data and a message packer 20 for packaging the generated trace data. The message packer 20 then provides the packaged trace data to a multiplexer or replicator 22 which provides the option to output the data to different targets exclusively or in parallel. The packed trace messages are then output either to an on-chip trace buffer 24 or off-chip (not shown) via an off-chip trace interface 26 and pins 28. Typical architectures following this approach are ARM's CoreSight, Infineon's MCDS and Nexus standard compliant architectures.

Conventional trace units such as that shown in FIG. 1 have several disadvantages. Conventional trace units trace the activities of the CPU and bus and utilize the same stream for packed trace messages which are then output to either an on-chip buffer and/or to off-chip interface via pins. One disadvantage of conventional trace units is the limited bandwidth which limits a trace to just the program flow with no or only a few data accesses, e.g. qualified by an address range. For finding sporadic bugs in a hard real time system where tracing of all chip internal activities over a long period of time is desired, a high speed interface requiring a larger chip area and/or alternate packaging, board design and/or tooling is cost prohibitive.

Additionally, conventional chips have trace interfaces with limited bandwidth, which allow traces for the program flow with no or only a few data accesses. However, for multi-core devices running at high frequencies, even this approach is no longer feasible economically.

Another option is to have a small on-chip trace buffer and a powerful trigger logic where the trace unit is configured to use the on-chip buffer as a circular buffer and the trace recording is stopped when it reaches the trigger. A typical error case is that a program writes a data value to a forbidden or unallowed location due to a wrong address pointer. In this case, the trigger for stopping the trace would be located on the forbidden address. This approach is helpful in situations where the root cause for the effect occurs shortly before the effect, and it is possible to trigger on the effect which is then captured in the trace. However, this approach is not ideal for all cases, especially when a longer context of the error is needed, for example, in which task and why the particular function on level N was called. For such information, a longer history is needed.

Additionally, there are trace architectures with more than one parallel Trace Unit, MSG packer, FIFO and Pins path on-chip. However, these paths are dedicated to a specific CPU, bus or subsystem and cannot be used to observe the same CPU, bus or subsystem with different trace unit settings adapted for a different output target on-chip trace buffer and off-chip trace interface.

Thus, the current architecture of conventional trace units is inadequate to support observation of long history traces, and conventional trace systems cannot be easily extended due to the overhead wiring and restricted trace memory bandwidth.

Therefore, there exists a need for a system and a method for a multi tier trace architecture for tracing a longer history context which does not significantly increase cost, efficiency or observation units required. More specifically, there is a need for a multi tier trace architecture which separates the trace data output for lower bandwidth trace information and high bandwidth trace information.

SUMMARY

In accordance with one aspect of the disclosure, a system for performing a multi-tier trace in a computer system comprises a low bandwidth trace information (LBTI) path for processing low bandwidth trace information from the plurality of CPUs and/or busses, a high bandwidth trace information (HBTI) path for processing high bandwidth trace information from the plurality of CPUs and/or busses, an on-chip trace buffer for receiving and recording the high bandwidth trace information until a specific event trigger occurs, and an off-chip tool interface for receiving and outputting in parallel the low bandwidth trace information. In one embodiment, the present disclosure further comprises a LBTI trace unit for generating a LBTI message, a HBTI trace unit for generating a HBTI message, and a replicator coupled to the plurality of CPUs and/or busses for receiving raw trace data from the CPUs and/or busses and providing them to the LBTI trace unit and to the HBTI trace unit.

In another embodiment, the present disclosure comprises a single trace unit for receiving the raw trace data from one or more of the CPUs and/or busses and for separating the raw trace data into high bandwidth trace information and low bandwidth trace information. A HBTI message is generated and provided to a HBTI message packer, and a LBTI message is generated and provided to a LBTI message packer. The packaged HBTI message is provided to the on-chip trace buffer, and the packaged LBTI message is provided in parallel to the off-chip trace interface.

In accordance with another aspect of the disclosure, a method for performing a multi-tier trace comprises receiving raw trace data from a computer system, separating the raw trace data into high bandwidth trace information (HBTI) and low bandwidth trace information (LBTI), recording the HBTI on an on-chip trace buffer until a specific event is triggered, and providing in parallel the LBTI continuously over an off-chip tool interface. In one embodiment, the raw trace data are provided to separate HBTI and LBTI trace units. A HBTI message is generated by the HBTI trace unit, and the HBTI message is provided to a HBTI message packer and on to the on-chip trace buffer. A LBTI message is generated by the LBTI trace unit, and the LBTI message is provided to a LBTI message packer and on to the off-chip trace interface. In another embodiment, the raw trace data are provided to a single trace unit where a HBTI message is generated for the HBTI and a LBTI message is generated for a LBTI. The HBTI and LBTI messages are then provided to separate HBTI and LBTI message packers respectively.

Further features, aspects and advantages of the present disclosure will become apparent from the following detailed description of the disclosure made with reference to the accompanying drawings.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and together with the description serve to explain the principles of the disclosure. Other embodiments of the present disclosure and many of the intended advantages of the present disclosure will be readily appreciated as they become better understood by reference to the following detailed description.

DETAILED DESCRIPTION

In the following detailed description, reference is made to the accompanying drawings, which form a part hereof, and in which is shown by way of illustration specific embodiments in which the disclosure may be practiced. It is to be understood that other embodiments may be utilized and structural or other changes may be made without departing from the scope of the present disclosure. Therefore, the following detailed description is not to be taken in a limiting sense, and the scope of the present disclosure is defined by the appended claims.

Trace flows are useful for software debugging of applications to determine which kind of events had taken place before a particular software problem arose. Trace flows are also useful to analyze performance of task-oriented embedded and non-embedded applications executed on various software/hardware platforms. For example, task oriented software programs may be executed by processors applicable to controlling aspects of industrial and consumer devices, or may include business and scientific application software. For the purposes of this description, applications, software programs, application software, program applications, and programs comprise sets of instructions executable by microprocessors, and such terms may be interchangeably used. In general, trace flows enable reconstruction of a monitored program flow.

Figure 2:
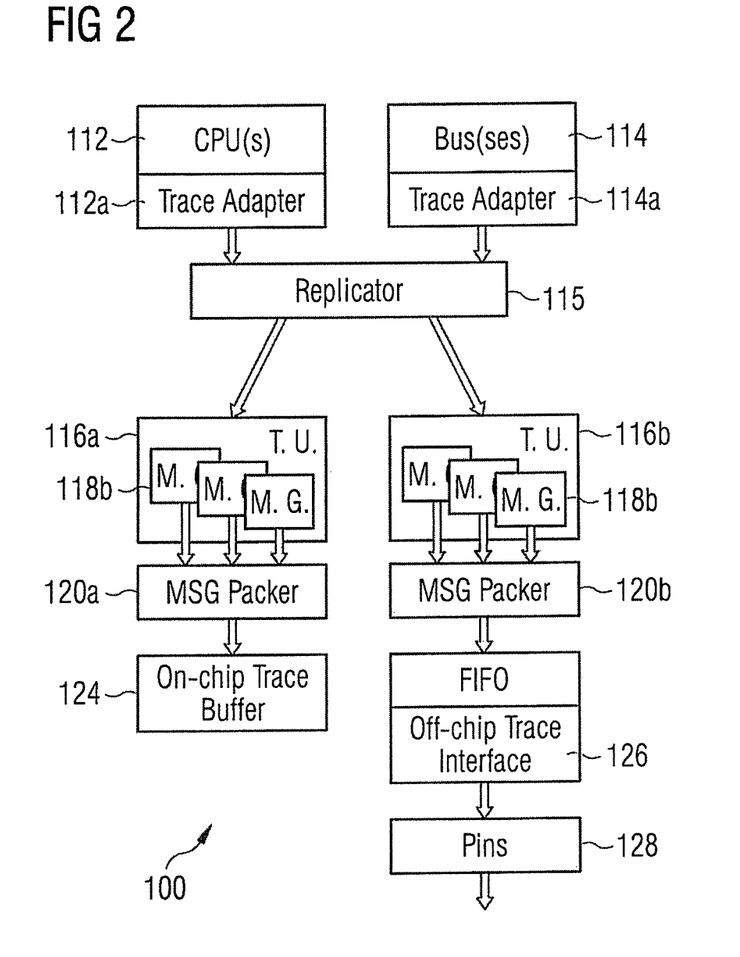
FIG. 2 shows an example schematic diagram of a multi-tier trace architecture in accordance with one embodiment of the present disclosure.

FIG. 2 is a high-level block diagram illustrating a multi tier trace architecture 100 in accordance with one embodiment of the present disclosure. A multi tier trace architecture in accordance with the present disclosure 100 is implemented on a microchip and includes one or more central processing units (CPUs) 112 with a trace adapter 112a, one or more busses 114 with a local trace adapter 114a, a replicator 115 coupled to the CPU trace adapters 112a and the bus trace adapters 114a, at least two trace units 116a and 116b coupled to receive input from the replicator 115. Each trace unit 116a, 116b, further comprises at least one message generator 118a, 118b for generating trace data and a message packer 120a, 120b for packaging the generated trace data. The message packers 120a, 120b then output the packaged trace data to either an on-chip trace buffer 124 or off-chip (not shown) via an off-chip trace interface 126 and pins 128.

The CPU trace adapters 112a and the bus trace adapters 112b collect the required trace information from the signals within the CPU design and convert them to a simpler and standardized format with fewer signals. For example, address and data may be aligned, only data of actually executed instructions may be output, and/or pipelining effects may be removed.

The replicator 115 is coupled to receive raw trace data from the CPU trace adapters 112a and the bus trace adapters 114a and provides output to the trace units 116a and 116b. The replicator 115 transfers the required trace information from all the trace adapters to the trace units. Depending on the trace unit capability both will get the same information or they will get different selections, however with a large common part. Transferring only information to a trace unit, which the trace unit can process saves wiring overhead and thus chip area. In one embodiment, the architecture of the trace adapter and the replicator may be combined in a single unit.

The trace units 116 enable reconstruction of a monitored program flow and process trace data, i.e. information about a running application, without halting its execution and may record the trace data sequentially, i.e. information about executed instructions may be stored in the sequence of their execution. The trace units 116 may record values of one or more instruction pointer registers, also known as program counter(s), and the values of one or more stacks of the CPU and/or may record data accessed and processed by the CPU and/or the data flow on the system bus or other busses of the CPU or system 100.

The message generators 118 convert the trace information from the CPU to trace messages. They are usually highly configurable and can qualify and compress the information. For a data trace, it is usually configurable that only accesses to a certain address range or address ranges result in a message (qualification by address). Some architectures support in addition qualification based on read and/or write access, bus master ID, data width and even data value. The output trace message can contain only the address or also the value. There are also many known options for the program flow trace.

The two trace units in FIG. 2 may be similar for an easy tool operation or adapted to the bandwidth of the output path for reducing chip area. The off-chip interface does not necessarily need to be a classical trace port where the data is actively output from the chip, such as is typical for the Nexus interface or ARM ETM. The FIFO can also be an on-chip trace buffer which is read by the tool via a (Nexus) JTAG, ARM's SWD, Infineon's DAP or similar interfaces.

Thus, the embodiment of the present disclosure described in FIG. 2 provides a multi-tier trace architecture 100 that allows different bandwidths for on-chip and off-chip trace. In other words, the present disclosure advantageously provides for the tracing solution to split or separate the trace data, such as high bandwidth trace information (HBTI) and low bandwidth trace information (LBTI). For example, in the case where a single CPU is being traced, the trace unit for the on-chip trace buffer may output a full program flow trace and all data accesses with address and data values. This high bandwidth information is recorded in the circular on-chip buffer until the trigger condition is hit. The other trace unit may output the task ID (at a task switch the operating system writes the task ID as a data value to a specific address and only this address is being traced). This task ID trace is very low bandwidth and can be read from a small on-chip FIFO even with a comparatively slow JTAG interface.

In one embodiment, the bandwidth of the trace information may be the essential differentiator between both information streams. Moreover, the distinction between high and low bandwidth trace information may be configurable and may depend on such factors as the chip's architecture and the protocols, technology and/or package utilized by the system. For example, in one embodiment, the order of magnitude for this distinction may be 10 Mbyte/s, and the low bandwidth may include 1 Mbyte/s and below, and the high bandwidth may be 100 Mbyte/s and more.

Typically, the high bandwidth trace information comprises low level trace information such as a full program flow and all data accesses of the CPU, and the low bandwidth trace information comprises high level trace information such as the task IDs recorded as data trace at the task switches. However, in another embodiment, the low bandwidth trace information may be a subset of the high bandwidth trace information, and thus, the high bandwidth trace information may also contain the high level trace information. Thus, if the bandwidth is limited, then it may be used to transfer the most interesting information which is usually, but not necessarily, high level trace information. In another example, the program flow may fall within the low bandwidth limits if only a very short code sequence is traced which occurs in long distances.

Figure 3:
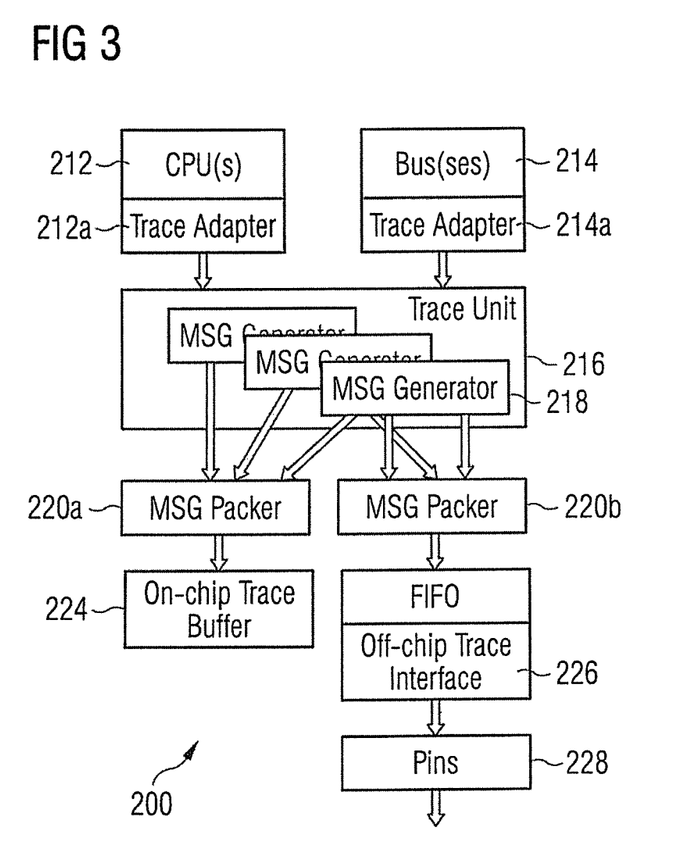
FIG. 3 shows an example schematic diagram of a multi-tier trace architecture in accordance with another embodiment of the present disclosure.

FIG. 3 shows an example schematic diagram of a multi-tier trace architecture 200 in accordance with another embodiment of the present disclosure. A multi-tier trace architecture in accordance with another embodiment of the present disclosure 200 is implemented on a microchip and includes one or more central processing units (CPUs) 212 with a trace adapter 212a, one or more busses 214 with a local trace adapter 214a, a trace unit 216 which further comprises at least one message generator 218 for generating trace data and at least two message packers 220a, 220b for packaging the generated trace data. The message packers 220a, 220b then output the packaged trace data to either an on-chip trace buffer 224 or off-chip (not shown) via an off-chip trace interface 226 and pins 228. In one embodiment, the message packer 220a exclusively outputs the packaged trace data to an on-chip trace buffer 124, and the message packer 220b exclusively outputs the packaged trace data off-chip via an on-chip trace interface 226 and pins 228.

The trace unit 216 enables reconstruction of a monitored program flow and processes trace data, i.e. information about a running application, without halting its execution and may record the trace data sequentially, i.e. information about executed instructions may be stored in the sequence of their execution. The trace unit 216 may record values of one or more instruction pointer registers, also known as program counter(s), and the values of one or more stacks of the CPU and/or may record data accessed and processed by the CPU and/or the data flow on the system bus or other busses of the CPU or system 100. The trace unit 216 further comprises a message generator feature.

The message generators 218 are configurable whether a specific message is output to one message packager, to the other message packager or to both. This can be configured for the whole message generator and/or for different qualification units within such a message generator. For example, one address range comparator with a large range is used for the high bandwidth on-chip trace, and a second comparator with a small range is used for the off-chip trace. Another option is to use the small range comparator for both, but for the high bandwidth on-chip trace there is a second comparator adding a second larger address range.

Thus, the embodiment of the present disclosure described in FIG. 3 provides a multi-tier trace architecture 200 where within the subblocks of trace unit 216 it can be configured whether a message is output to either the on-chip trace buffer 224 or the on-chip trace buffer 226 or both. This property allows significant savings in chip area compared to the embodiment in FIG. 2 by having just one trace unit instead of two. For supporting the embodiment in FIG. 2, it is sufficient that each MSG generator just has the two control bits for the trace output target. The data trace message generator just needs to have one comparator with this capability. For the on-chip trace, no data address qualification is used and for the task ID trace, the single comparator is sufficient. Thus, the only significant area overhead compared to the conventional system in FIG. 1 is the additional message packer.

Thus, the present disclosure advantageously supports the observation of long history traces for one or more CPUs and/or busses in a computer system by providing for the separation of trace data into high bandwidth trace information and low bandwidth trace information without significantly increasing cost or the number of trace units required.

Figure 4:
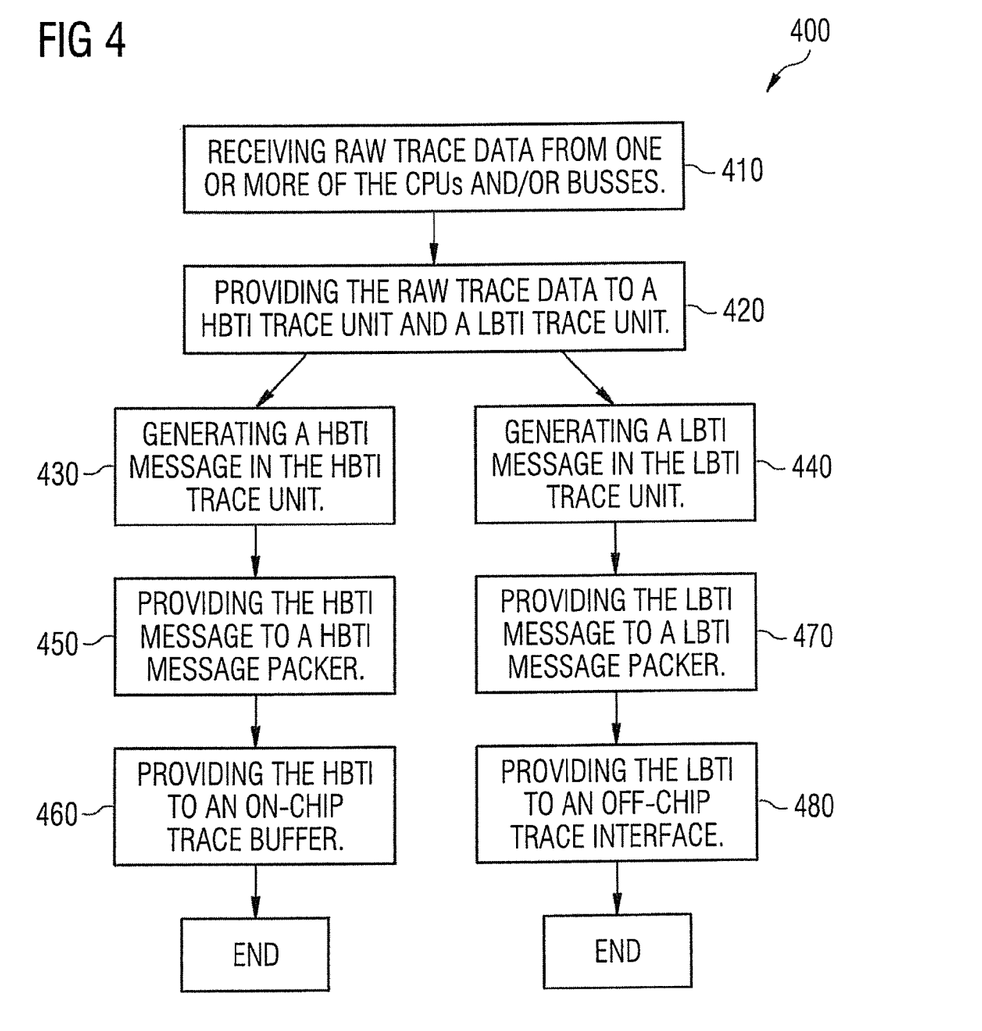
FIG. 4 is a flowchart showing a method for performing a multi-tier trace in accordance with one embodiment of the present disclosure.
Figure 5:
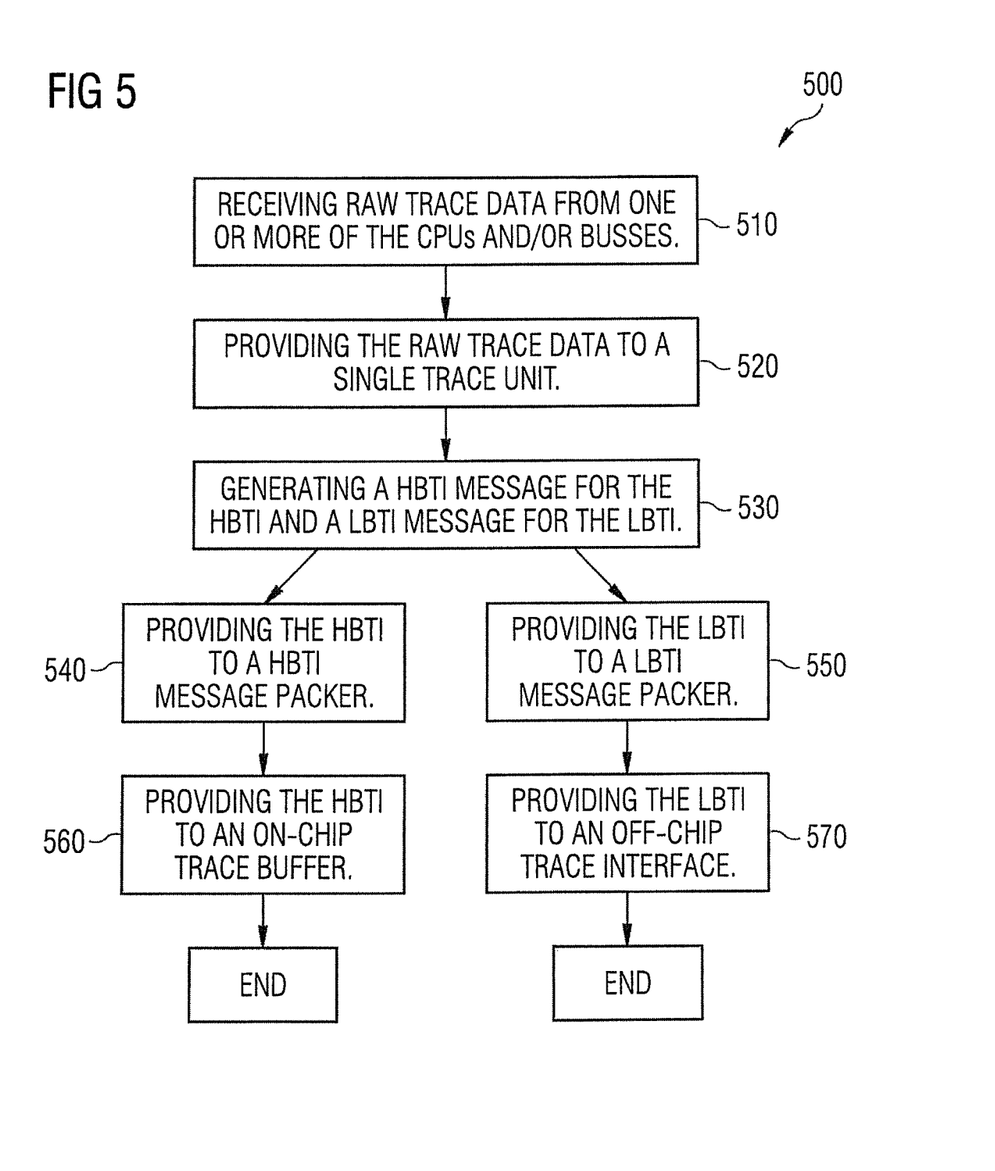
FIG. 5 is a flowchart showing a method 500 for performing a multi-tier trace in accordance with another embodiment of the present disclosure.

FIGS. 4 and 5 show methods for performing a multi-tier trace. In general, a method for performing a multi-tier trace comprises receiving raw trace data from a computer system, separating the raw trace data into high bandwidth trace information (HBTI) and low bandwidth trace information (LBTI), recording the HBTI on an on-chip trace buffer until a specific event is triggered, and providing in parallel the LBTI over an off-chip trace tool interface. In one embodiment, the HBTI and the LBTI are provided to separate HBTI and LBTI trace units respectively. In another embodiment, the HBTI and the LBTI are provided to a single trace unit and are then provided to separate HBTI and LBTI message packers.

More specifically, FIG. 4 is a flowchart showing a method 400 for performing a multi-tier trace in accordance with one embodiment of the present disclosure comprising separate trace units. For clarity, the method 400 for performing a multi-tier trace is described in context of the system 200. However, in alternate embodiments, other configurations may be used. Moreover, other embodiments may perform the acts described here in different orders and/or other embodiments may perform additional and/or different acts than those described here.

The system of the present disclosure receives all raw trace data needed from one or more of the CPUs and/or busses in the system at 410. The replicator provides this raw trace information to both paths at 420. The HBTI trace unit converts the raw trace information to HBTI messages at 430. The HBTI messages may include, but are not required to, the LBTI as well. The LBTI trace unit generates from the raw trace data messages with much less bandwidth at 440. The HBTI is then provided to a HBTI message packer at 450 and then recorded on an on-chip trace buffer at 460 until a specific trigger occurs. The LBTI is provided to a LBTI message packer at 470 and eventually is provided to an off-chip trace interface at 480.

FIG. 5 is a flowchart showing a method 500 for performing a multi-tier trace in accordance with another embodiment of the present disclosure comprising a single trace unit. For clarity, the method 500 for performing a multi-tier trace is described in context of the system 300. However, in alternate embodiments, other configurations may be used. Moreover, other embodiments may perform the steps described here in different orders and/or other embodiments may perform additional and/or different steps than those described here.

The computer processing system receives raw trace data from one or more of the CPUS and/or busses in the system at 510. The raw trace data are then provided to a single trace unit at 520. The trace unit converts the raw trace information into HBTI and LBTI messages at 530. The HBTI is provided to a HBTI message packer at 540 and then recorded on an on-chip trace buffer at 560. The LBTI is provided to a LBTI message packer at 550 and then further provided to an off-chip trace interface at 570. As mentioned above, the HBTI and the LBTI may overlap, or as is more often the case, the LBTI may be a subset of the HBTI. Thus, in one embodiment of the present disclosure, the message generators are configurable and may generate a HBTI message, a LBTI message or both which may then be sent to one or both message packers. For example, one address range comparator with a large range may used for the high bandwidth on-chip trace, and a second comparator with a small range may used for the off-chip trace. In another embodiment, a small range comparator may be used for both, but for the high bandwidth on-chip trace there may be a second comparator adding a second larger address range.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A system for separating trace data output from a plurality of CPUs and/or busses, the system comprising:
    a low bandwidth trace information (LBTI) path configured to receive and process low bandwidth trace information from the plurality of CPUs and/or busses;
    a high bandwidth trace information (HBTI) path configured to receive and process high bandwidth trace information from the plurality of CPUs and/or busses;
    an on-chip trace buffer configured to record the high bandwidth trace information until a specific event trigger occurs;
    an off-chip trace interface configured to receive and output in parallel the low bandwidth trace information;
    a HBTI trace unit configured to process the high bandwidth trace information and generate a HBTI message; and
    a LBTI trace unit configured to process the low bandwidth trace information and generate a LBTI message.

2. The system of claim 1, further comprising:
    a replicator coupled to the plurality of CPUs and/or busses, and configured to receive raw trace data from the CPUs and/or busses and provide the raw trace data to the HBTI trace unit and to the LBTI trace unit.

3. The system of claim 2, further comprising:
    a HBTI message packer coupled to the HBTI trace unit, and configured to receive and package the high bandwidth trace information and forward the high bandwidth trace information to the on-chip trace buffer.

4. The system of claim 2, further comprising:
    a LBTI message packer coupled to the LBTI trace unit, and configured to receive and package the low bandwidth trace information and forward the low bandwidth trace information to the off-chip trace interface.

5. The system of claim 1, further comprising:
    a trace unit configured to receive raw trace data from the CPUs and/or busses and forward the high bandwidth trace information to a HBTI message packer and forward the low bandwidth trace information to a LBTI message packer;
    wherein the HBTI message packer configured to forward the high bandwidth trace information to the on-chip trace buffer, and the LBTI message packer is configured to forward the low bandwidth trace information to the off-chip trace interface.

6. The system of claim 5, wherein the trace unit further comprises a message generator configured to generate a HBTI message or a LBTI message or both.

7. The system of claim 1, wherein the LBTI is a subset of the HBTI.

8. The system of claim 1, wherein the low bandwidth trace information comprises low bandwidth high level trace information.

9. The system of claim 8, wherein the low bandwidth high level trace information comprises task IDs recorded as a data trace at task switches.

10. The system of claim 1, wherein the high bandwidth trace information comprises high bandwidth low level trace information.

11. The system of claim 9, wherein the high bandwidth low level trace information comprises a full program flow and all data accesses of the CPU.

12. A method for separating trace data from a plurality of CPUs and/or busses, the method comprising:
    receiving raw trace data from the CPUs and/or busses;
    separating the raw trace data into high bandwidth trace information (HBTI) and low bandwidth trace information (LBTI);
    recording the high bandwidth trace information on an on-chip trace buffer until a specific event is triggered;
    outputting in parallel with the recording of the high bandwidth trace information the low bandwidth trace information over an off-chip trace interface;
    providing the raw trace data to a HBTI trace unit and to a LBTI trace unit, and
    generating a HBTI message in the HBTI trace unit and generating a LBTI message in the LBTI trace unit.

13. The method of claim 12, further comprising:
    providing the HBTI from the HBTI trace unit to a HBTI message packer to generate packaged HBTI;
    providing the packaged HBTI to the on-chip trace buffer;
    providing the LBTI from the LBTI trace unit to a LBTI message packer to generate packaged LBTI; and
    providing the packaged LBTI to an off-chip trace interface.

14. The method of claim 12, wherein the raw trace data is provided to a single trace unit.

15. The method of claim 14, further comprising:
    generating a HBTI message and a LBTI message;

providing the HBTI message to a HBTI message packer to generate packaged HBTI;
providing the LBTI message to a LBTI message packer to generate package LBTI;
providing the packaged HBTI to the on-chip trace buffer; and
providing in parallel to providing the package HBTI the packaged LBTI to an off-chip trace interface.

16. The method of claim 12, wherein the LBTI is a subset of the HBTI.

17. The method of claim 12, wherein the low bandwidth trace information comprises low bandwidth high level trace information.

18. The method of claim 17, wherein the low bandwidth high level trace information comprises task IDs recorded as data trace at task switches.

19. The method of claim 17, wherein the high bandwidth low level trace information comprises a full program flow and all data accesses of the CPU.

20. The method of claim 12, wherein the high bandwidth trace information comprises high bandwidth low level trace information.

21. A system for separating raw trace data outputted from a plurality of CPUs and/or busses, the system comprising:
a low bandwidth trace information (LBTI) trace unit configured to process low bandwidth trace information;
a high bandwidth trace information (HBTI) trace unit configured to process high bandwidth trace information, wherein:
the LBTI trace unit and the HBTI trace unit separate the raw trace data into HBTI and LBTI;
the LBTI trace unit is configured to generate a LBTI message for the LBTI; and
the HBTI trace unit is configured to generate a HBTI message for the HBTI;
a replicator coupled to the plurality of CPUs configured to receive raw trace data from the CPUs and/or busses and provide the raw trace data to the LBTI trace unit and to the HBTI trace unit;
an on-chip trace buffer configured to record the HBTI until a specific event trigger occurs; and
an off-chip trace interface configured to receive and output in parallel with recording the HBTI the LBTI.

22. The system of claim 21, further comprising:
a HBTI message packer coupled to the HBTI trace unit, and configured to package the high bandwidth trace information and forward the high bandwidth trace information to the on-chip trace buffer.

23. The system of claim 21, further comprising:
a LBTI message packer coupled to the LBTI trace unit, and configured to package the low bandwidth trace information and forward the low bandwidth trace information to the off-chip trace interface.

24. The system of claim 21, wherein the LBTI is a subset of the HBTI.

25. The system of claim 21, wherein the low bandwidth trace information comprises low bandwidth high level trace information.

26. The system of claim 21, wherein the low bandwidth high level trace information comprises task IDs recorded as a data trace at task switches.

27. The system of claim 21, wherein the high bandwidth trace information comprises high bandwidth low level trace information.

28. The system of claim 27, wherein the high bandwidth low level trace information comprises a full program flow and all data accesses of the CPU.

29. A system for separating raw trace data output from a plurality of CPUs and/or busses, the system comprising:
a trace unit configured to receive the raw trace data from the CPUs and/or buses and separate the raw trace data into high bandwidth trace information (HBTI) and low bandwidth trace information (LBTI), wherein the trace unit is configured to generate a HBTI message for the high bandwidth trace information and generate a LBTI message for the low bandwidth trace information;
an on-chip trace buffer configured to receive and record the HBTI from the trace unit until a specific event trigger occurs; and
an off-chip trace interface configured to receive in parallel with the recording of the HBTI the LBTI from the trace unit.

30. The system of claim 29, further comprising:
a HBTI message packer configured to package the HBTI before providing it to the on-chip trace buffer; and
a LBTI message packer configured to package the LBTI before providing it to the off-chip trace interface.

31. The system of claim 29, wherein the LBTI is a subset of the HBTI.

32. The system of claim 29, wherein the low bandwidth trace information comprises low bandwidth high level trace information.

33. The system of claim 32, wherein the low bandwidth high level trace information comprises task IDs recorded as a data trace at task switches.

34. The system of claim 29, wherein the high bandwidth trace information comprises high bandwidth low level trace information.

35. The system of claim 34, wherein the high bandwidth low level trace information comprises a full program flow and all data accesses of the CPU.

* * * * *